(12) United States Patent
Koslowski et al.

(10) Patent No.: US 9,457,299 B2
(45) Date of Patent: Oct. 4, 2016

(54) OIL SEPARATOR CARTRIDGE

(75) Inventors: Werner Koslowski, Neuss (DE);
Andreas Ostgathe, Solingen (DE);
Herbert Schlensker, Leverkusen (DE);
Johannes Sinstedten, Korschenbroich (DE)

(73) Assignee: BEKO TECHNOLOGIES GMBH, Neuss (DE)

( * ) Notice: Subject to any disclaimer, the term of this patent is extended or adjusted under 35 U.S.C. 154(b) by 476 days.

(21) Appl. No.: 13/814,379

(22) PCT Filed: Aug. 4, 2011

(86) PCT No.: PCT/EP2011/063487
§ 371 (c)(1),
(2), (4) Date: Mar. 15, 2013

(87) PCT Pub. No.: WO2012/017055
PCT Pub. Date: Feb. 9, 2012

(65) Prior Publication Data
US 2013/0206675 A1    Aug. 15, 2013

(30) Foreign Application Priority Data

Aug. 6, 2010   (DE) .................. 10 2010 036 895

(51) Int. Cl.
| | | |
|---|---|---|
| *B01D 29/96* | (2006.01) | |
| *B01D 29/11* | (2006.01) | |
| *B01D 29/52* | (2006.01) | |
| *B01D 29/54* | (2006.01) | |
| *B01D 29/58* | (2006.01) | |
| *B01D 35/027* | (2006.01) | |
| *C02F 1/40* | (2006.01) | |
| *F01M 11/03* | (2006.01) | |
| *F01M 13/04* | (2006.01) | |
| *F16N 39/00* | (2006.01) | |

(52) U.S. Cl.
CPC ............. *B01D 29/96* (2013.01); *B01D 29/114* (2013.01); *B01D 29/52* (2013.01); *B01D 29/54* (2013.01); *B01D 29/58* (2013.01); *B01D 35/027* (2013.01); *F01M 11/03* (2013.01); *C02F 1/40* (2013.01); *F01M 13/04* (2013.01); *F16N 39/002* (2013.01)

(58) Field of Classification Search
None
See application file for complete search history.

(56) References Cited

U.S. PATENT DOCUMENTS

| 4,419,240 | A | * | 12/1983 | Rosaen | .......................... 210/444 |
| 5,720,874 | A | | 2/1998 | Siegler | |
| 2003/0000895 | A1 | * | 1/2003 | Hensley | ............. B01D 17/0202 |
| | | | | | 210/670 |
| 2006/0081518 | A1 | * | 4/2006 | Yee et al. | ......................... 210/90 |

FOREIGN PATENT DOCUMENTS

| DE | 90040198 U1 | 9/1990 |
| DE | 60004523 T2 | 4/2004 |
| DE | 102006009524 A1 | 9/2007 |
| DE | 102007038027 | 2/2008 |
| EP | 0483119 A2 | 4/1992 |
| WO | 2006126237 | 11/2006 |
| WO | 2008063159 A2 | 5/2008 |

OTHER PUBLICATIONS

ISR EP2011063487 dtd May 12, 2011.

* cited by examiner

*Primary Examiner* — Benjamin Kurtz
(74) *Attorney, Agent, or Firm* — Cantor Colburn LLP

(57) ABSTRACT

The invention relates to a separation device (1) for separation of a constituent from a liquid mixture (5), comprising a vessel (2), an inlet (3) and at least one outlet (6), said inlet (3) being arranged above the outlet (6), a filter material (7) capable of binding the constituent and is arranged within the vessel (3) between the inlet (3) and the outlet (6) such that flow passes through the filter material (7). The filter material (7) is arranged in a cartridge (4) inserted into the vessel (3).

7 Claims, 7 Drawing Sheets

OIL SEPARATOR CARTRIDGE

FIELD

Disclosed is a separation device for purposes of separating one constituent of a fluid, with a container,
- an inlet and at least one outlet, wherein the inlet is arranged above the outlet,
- a filter material that has the ability to bind the constituent, for example oil, and
- is arranged within the container between the inlet and the outlet such that the flow is through the filter material.

BACKGROUND

Devices for the separation of fluids, or segregation devices for the segregation of fluids, are of known art. For example the registered design DE 90 040 19.8 describes a device for sucking out a light fluid that has been separated in a fluid separator. The said device has a housing in which a container is arranged in turn. In the container is located a bag, which is filled with an oil binding agent. The oil-binding agent is a buoyant granulate based on a polyurethane foam. The wastewater contaminated with a light fluid enters into the housing through the entry opening. As long as the oil-binding agent in the container is substantially unsaturated, the container is only slightly immersed into the layer of light fluid. The light fluid permeates into the container, and the bag containing the oil-binding agent, and is adsorbed by the oil-binding agent. With increasing saturation of the oil-binding agent the weight of the bag increases such that the container sinks ever further. When the container has reached its lowest position the oil-binding agent is substantially saturated with the light substance and the bag can be replaced. The fluid that is not absorbed exits through an outlet opening. Basically the principle of the said device is sensible, but the device itself is very complex and susceptible to faults. For example there is no guarantee that the total volumetric flow of the fluid mixture actually flows through the bag. In this respect complete filtering is not necessarily ensured.

Building on the said device, DE 600 04 523 D2 also describes a segregation device and a segregation method for the segregation of fluids with different densities. Fundamentally the device described in the above document functions in accordance with the same principle, namely that an adsorbent material is saturated with one of the two fluids and as a result sinks down into the other fluid. However, an essential difference consists in the fact that in the said device the total volumetric flow must pass through the segregating component, which consists of an adsorbing material. The segregating component is arranged within a container such that it completely fills the cross-section of the container. What is disadvantageous in the said device, however, is the friction between the segregating component and the container. With increasing adsorption, i.e. contamination, of the segregating component the frictional characteristics alter as a result of fluctuations in temperature and pressure, which in turn affects the filtering process and the necessary energy expenditure. As a result the device is susceptible to faults and this can lead to increased maintenance activity.

The separation devices, i.e. oil/water separators, have moreover the disadvantage that the discharge times before a changeover of the absorbing material are very long, and the absorbing material, i.e. the filter that has the said material, has a considerable weight in the case of the larger devices.

SUMMARY

Against this background creating a separation device that enables a simple and quick replacement of the filter material is disclosed. In particular the flow through the filter material should thereby be uniform. A further advantage consists in configuring the separation device such that it can be adapted to different spatial conditions. Adaptation with regard to volumetric flow rates, and/or with regard to the quantity of fluid to be separated should also be possible.

The advantage is achieved by means of a separation device with the features of Claim 1. Accordingly the filter material is arranged in a cartridge that is inserted into the container.

By virtue of the arrangement of the filter material in a cartridge a better through flow and/or a simplification of the replacement of the filter material is enabled.

Regarding details of the filter material reference is made to the application DE 102005012718, which is hereby incorporated by virtue of the said reference. It is, for example, manufactured from polypropylene. It is, for example, a porous or a fibrous material.

The cartridge is, for example, closed, apart from an intake opening and an outlet opening that is connected with the outlet of the container in terms of fluid flow, and is manufactured out of plastic.

The cartridge is advantageously embodied in the form of a segment. This means that a plurality of cartridges, or cartridge segments, can be inserted into a container. The volume that is otherwise available for only one cartridge is therefore utilised by a plurality of smaller individual cartridges. Here the cartridges can be arranged next to one another, or one above another; what is important is that the space available must be utilised as effectively as possible. For example, in the case of a container with a rectangular cross-section each of the cartridges can have triangular cross-sections, such that four cartridges arranged adjacent to one another optimally fill the rectangular cross-section of the container. Alternatively and/or additionally horizontal partitioning can preferably be provided, in which the cartridges are arranged stacked one above another.

In what follows the term "cartridge" is used both for cartridges and also for cartridge segments.

The individual cartridges can have their own inlets in each case, through which the fluid, i.e. the fluid mixture, flows into the cartridges; in a particularly advantageous variant the individual cartridges are together immersed into the fluid level of the container. This has the advantage that the fluid can be optimally apportioned to all the cartridges. This leads to a better segregation result and, by virtue of the uniform utilisation of the individual cartridges, the achievement that the filter material within the cartridges is saturated at approximately the same point in time, so that all the cartridges can be changed over in only a single replacement procedure.

The individual cartridges can also be connected with one another such that the fluid, or condensate, flows firstly into a first cartridge and from there, through an outlet of the first cartridge and a corresponding inlet of a second cartridge, into the second cartridge.

Cartridges arranged one above another or in series can preferably be connected with one another by means of a central pipe, or riser. The riser preferably extends coaxially through the individual cartridges, and has openings through which the fluid that has flowed through the cartridges, i.e. through the filter material located within the cartridges, can flow into the interior of the riser. The said embodiment presents itself in particular in the case of an arrangement of the cartridges one above another. Thus the cartridges surround the riser in certain regions, wherein the fluid, or condensate, can flow in from above, from below, or radially, through corresponding openings in the cartridge walls into the cartridges. In this manner the cartridges are located totally within the fluid that is located in the container.

In a particularly advantageous variant of embodiment a plurality of cartridges can be arranged one above another and also next to one another. Within the container there are, so to speak, a plurality of towers, each consisting of a plurality of cartridges that are arranged next to one another.

Within the container the cartridges can be connected with one another, but they can also be held within the container fully independently of one another. In the above-described variant of embodiment, which uses a riser that passes through a plurality of cartridges, each of the cartridges can be attached to the riser, but they can also be connected with one another. It is essential that the cartridges are prevented from floating upwards. This can only be achieved by the connection of the cartridges with the riser.

In a particularly advantageous variant of embodiment the cartridges have central openings in which a cartridge sealing ring is arranged. Via these openings the cartridges are slid onto the riser. They are prevented from floating upwards by means of frictional forces.

Furthermore or exclusively, means for a detachable connection between cartridge and container are preferably provided, which, for example, can also prevent the cartridge from floating upwards. In one configuration manual intervention is required in order to release the connection. The means are then preferably arranged on the upper face of the cartridge. These means preferably comprise frictional forces or latching means, so that for release of the connection as far as possible no additional hand grip other than the parting movement is necessary. It is not necessary to push the cartridges downwards for purposes of providing a sealing force, the hold-down device is required exclusively to prevent the cartridges from floating upwards.

The means for a detachable connection between the cartridges and the container can for example be embodied as grab handles, additional weights or latching mechanisms, which, depending upon the arrangement, engage or are arranged either underneath, above or laterally on the cartridge.

An outlet line is normally connected to the outlet of the container; this translates into a riser line for purposes of draining off the cleaned fluid, It is possible just to close the outlet and to vent the outlet line and riser line in order to replace the cartridges without the condensate gaining access to the clean water side. Replacement of the cartridges is thus possible without a complete drainage as far as a service tap that connects to the riser line further downstream. By this means downtimes for the separation device and thus also for replacement of the cartridges can be shortened.

In accordance with the disclosure a latching mechanism on the floor of the container is particularly advantageous. A sealing ring that is produced from an elastic material and has latching projections, has sufficient retaining force for a cartridge in order to prevent the latter from floating upwards. By virtue of the elasticity it is nevertheless possible to pull the cartridge in question upwards out of the sealing ring, since the latching projections are then deformed. A riser that is arranged within the cartridge in question is preferably positioned on the sealing ring located on the floor, whereby the latching projections of the sealing ring latch into corresponding openings or undercuts.

The sealing ring can preferably also be arranged in an opening of the cartridge that is positioned onto the upright riser or container. The latching projections of the sealing ring latch into corresponding openings or undercuts that are arranged on the riser of the container. The said variant has the advantage that when the cartridge or cartridge segment is changed over, the sealing rings are also removed, as a result of which any excess wear of the sealing rings is avoided.

In accordance with the disclosure the separation device can be used with a suction pump or pressure pump positioned upstream or downstream as a flow regulator. In all cases the objective is to maintain the prescribed through flow at all times, for which reason the pump is understood to be a flow regulator. In this manner significantly higher service lives are achieved for the segregation device. This is particularly advantageous if regular maintenance intervals are planned and a changeover of filter elements between the planned maintenance dates is to be avoided. The pump can be level-regulated or time-regulated. "Level regulation" is understood to mean that the pump switches itself on when an appropriate fill quantity is attained within the separation device. Alternatively, and in particular when there is a regular flow into the separation device, the pump can also be switched on in accordance with defined time intervals. A combination of the two options is also conceivable.

In accordance with the disclosure the cartridges have an essentially triangular cross-section, which is isosceles and right-angled. With 2, 4, 8 or 16 cartridges, etc. it is always possible to form a quadratic figure. The said arrangement offers the advantage that with a standardised cartridge container sizes with the cross-sectional ratios 1:2:4 etc. are achieved; these have the optimal ratio between cross-sectional area and perimeter.

A further essential advantage as a result of the use of a pump consists in the fact that the pump can operate in the reverse direction and thus the separation device can be cleaned by means of backwashing.

Advantageous configurations are in each case the subjects of the dependent claims. Here it is to be noted that the features individually embodied in the patent claims can be combined with one another in any technically logical manner so as to demonstrate further configurations of the disclosure.

BRIEF DESCRIPTION OF THE FIGURES

The disclosure is described in more detail on the basis of the following figures. The examples of embodiment shown are to be understood just as examples and are not designed to limit the disclosure to the features shown. Here.

DETAILED DESCRIPTION

Figure 1:
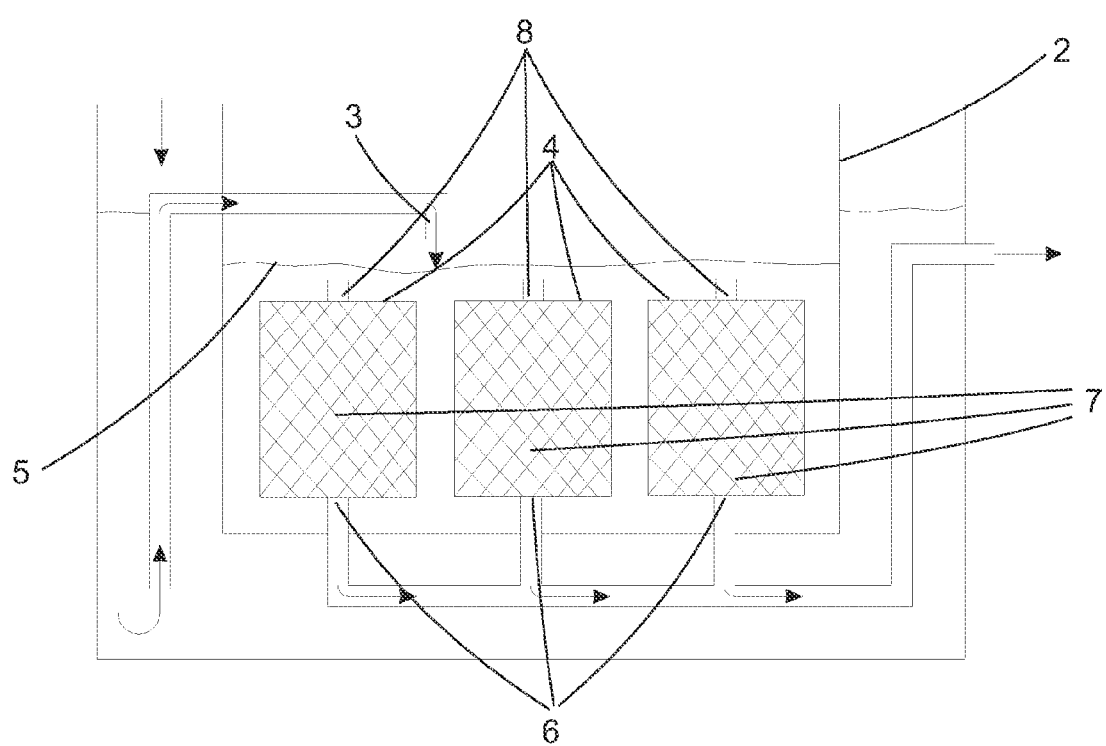
FIG. 1 shows a first inventive form of embodiment of a separation device.

FIG. 1 shows an inventive form of embodiment of the separation device. In a container 2 are located a plurality of cartridges 4, which are filled with a filter material 7. A fluid, or a fluid mixture, is supplied via the single intake 3 to the container 2, preferably continuously, and forms the fluid level 5, in which the cartridges 4 are immersed. The filter material 7 serves to provide the separation of a fluid constituent of the fluid supplied to the container 3, for example the separation of oil from a water-oil mixture. For example, the fluid that is separated has a lower specific density than the fluid with which it was mixed. The fluid flows through the filter material 7, since the cartridge 4 is provided with an intake opening 8. An outlet opening that is provided on each of the cartridges is connected in each case with an outlet 6 of the container in terms of fluid flow, and serves to drain off the filtered fluid. The flow path of the fluid is indicated by arrows.

Figure 2:
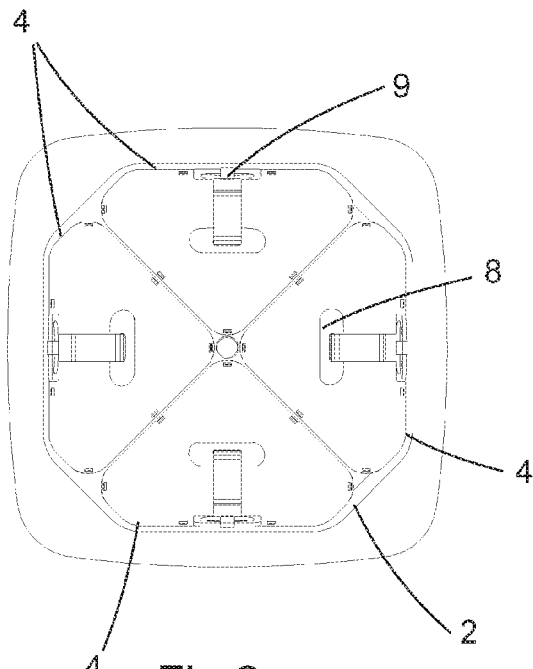
FIG. 2 shows a first variant of the arrangement of cartridges in a container.
Figure 3:
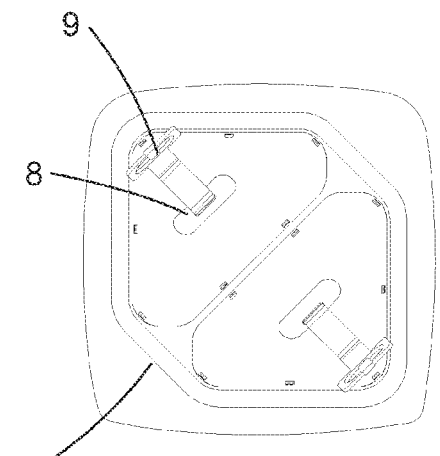
FIG. 3 shows a second variant of the arrangement of cartridges in a container.
Figure 6:
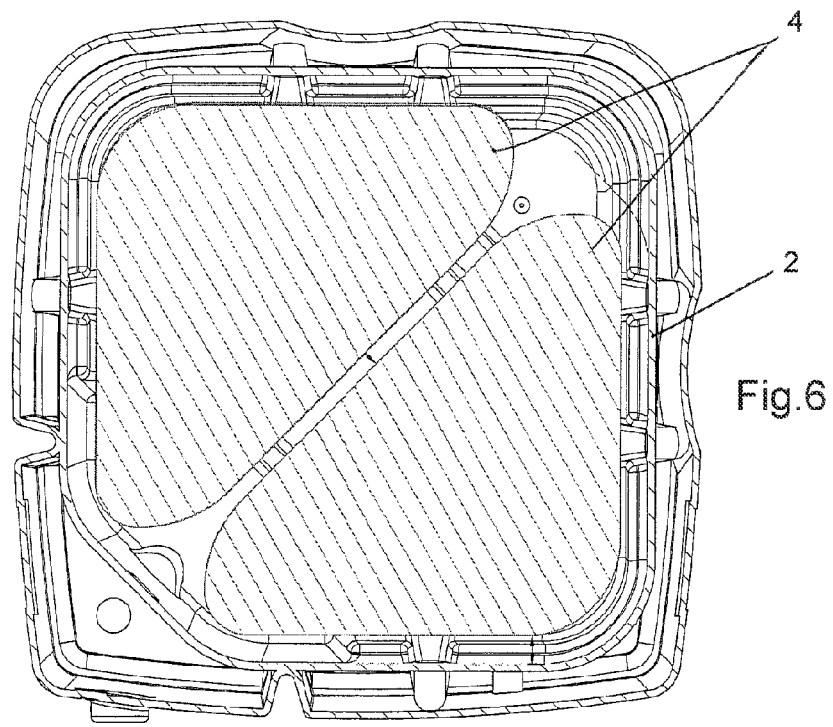
FIG. 6 shows a further representation of the arrangement of two cartridges in the container.
Figure 7:
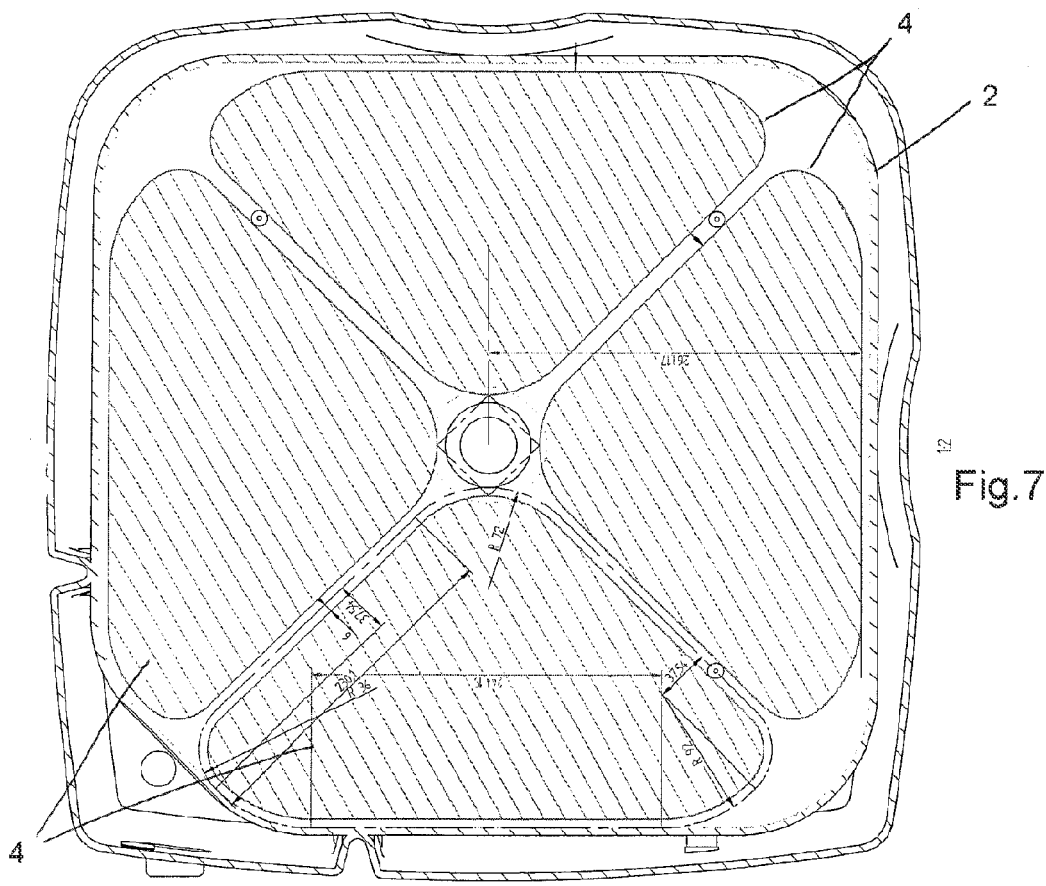
FIG. 7 shows a second representation of four cartridges in the container.

FIGS. 2 and 3 show differing possible arrangements of the cartridges 4 in a container 2, in each case in plan view. FIGS. 6 and 7 are related design drawings. In FIGS. 2 and 3 the oval intake openings 8 and levers 9 are also drawn in; on one hand the latter engage in the openings 8 and on the other hand are attached to the container 2 by means of a latching mechanism, on the one hand so as to provide a detachable connection, and at the same time to counter the buoyancy of the cartridge 4 in the fluid.

Figure 4:
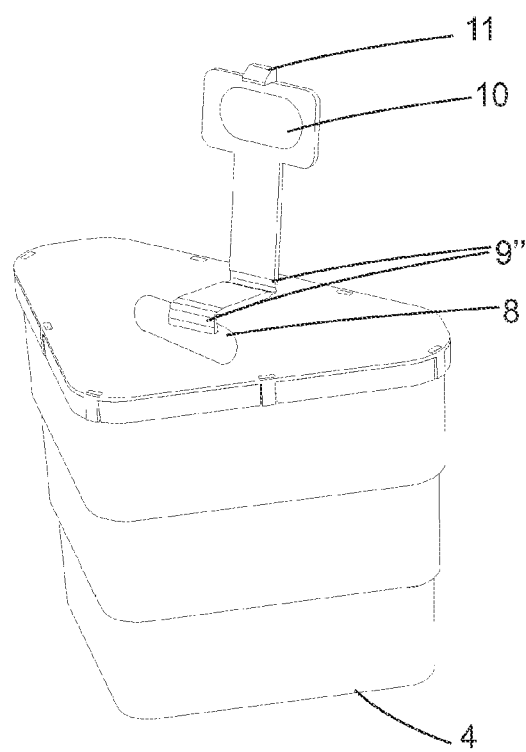
FIG. 4 shows a first variant of embodiment of a hold-down device for purposes of fixing a cartridge in the container.

FIG. 4 shows a hinge-type design of the lever 9" in the form of a simple film hinge, one arm of which can be moved for purposes of releasing the cartridge 4. Furthermore a latching means 11 is provided, which interacts with a complementary latching means fitted to the container so as to provide the detachable connection. A gripping loop 10 eases the extraction of the cartridge 4.

Figure 5:
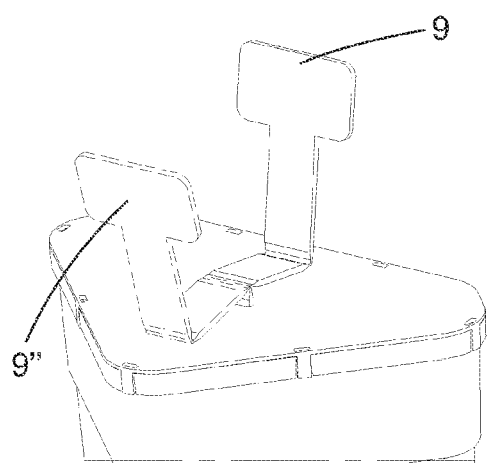
FIG. 5 shows a second variant of embodiment of a hold-down device.

FIG. 5 shows a simple lever 9, once again engaging in an opening of the cartridge 4, as a connecting means between container and cartridge 4. Whereas another possible arrangement, oppositely arranged, is demonstrated by 9"'.

Figures 8, 9:
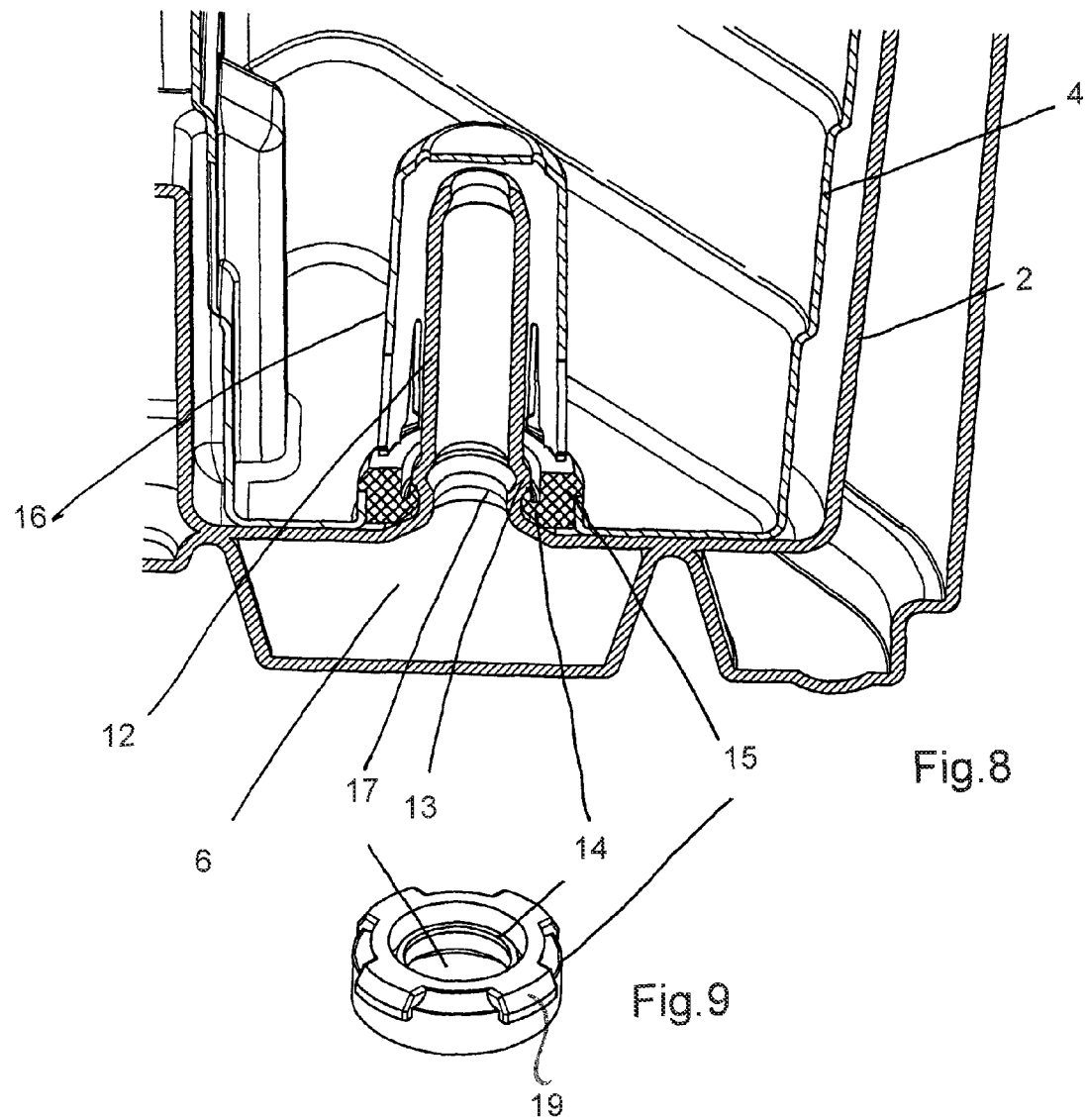
FIG. 8 shows a scrap section of a cartridge with a hold-down device located on the floor.
FIG. 9 shows an inventive sealing ring for purposes of fixing a cartridge in the container.

In FIG. 8 a detachable connection is demonstrated, in which by means of a floor-located latching mechanism between cartridge 4 and container 2 a detachable connection between these is fabricated. A riser 12 designed in the floor of the container 2 is inserted into the outlet opening 17 of the cartridge 4. By this means a connection is fabricated between the cartridge 4 and the outlet 6 of the container 2 in terms of fluid flow. A sealing ring 15 with a surrounding sealing lip 14 is inserted into the outlet opening 17 of the cartridge 4. The said sealing lip 14 latches under a circumferential latching projection 13 of the riser 12 and thus the detachable connection is fabricated.

FIG. 9 shows a representation in perspective of the sealing ring 15 in FIG. 8. Next to the interior sealing lip 14 can be discerned latching projections 19 that are arranged outboard; these hold the sealing ring 15 within the outlet opening 17, where they engage in corresponding undercuts or openings.

Figure 10:
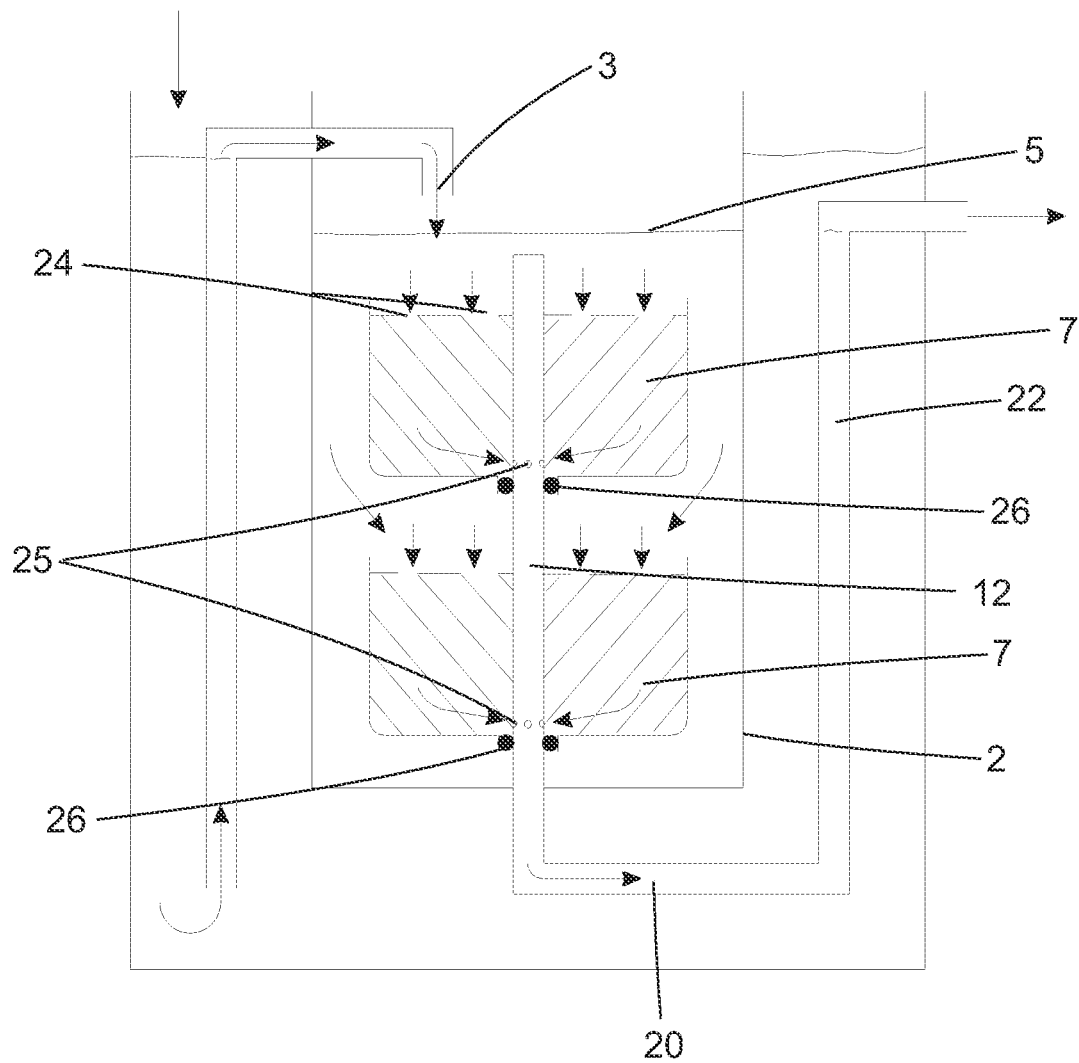
FIG. 10 shows a further variant of embodiment of the arrangement of cartridges in the container.

FIG. 10 shows a greatly simplified representation of the arrangement of cartridges 4 in the container 2. The cartridges 4 are arranged stacked one above another, and using centrally arranged cartridge openings are attached to the central riser 12. The fluid mixture gains access to the container 2 via the intake 3, and, in the example of embodiment shown, flows from above into the cartridges 4 through appropriate inlet openings 24. The fluid flows through the filter material 7 and gains access to the riser through riser openings 25. The fluid is drained off through the outlet line 20 and the adjoining riser line 22. The cartridges 4 are positioned on the riser 12 by simply sliding them onto the riser 12. Cartridge sealing rings 26 are preferably provided for sealing purposes. The riser 12 is closed at its end, so that the fluid can only flow through the cartridges 4 into the riser.

Figure 11:
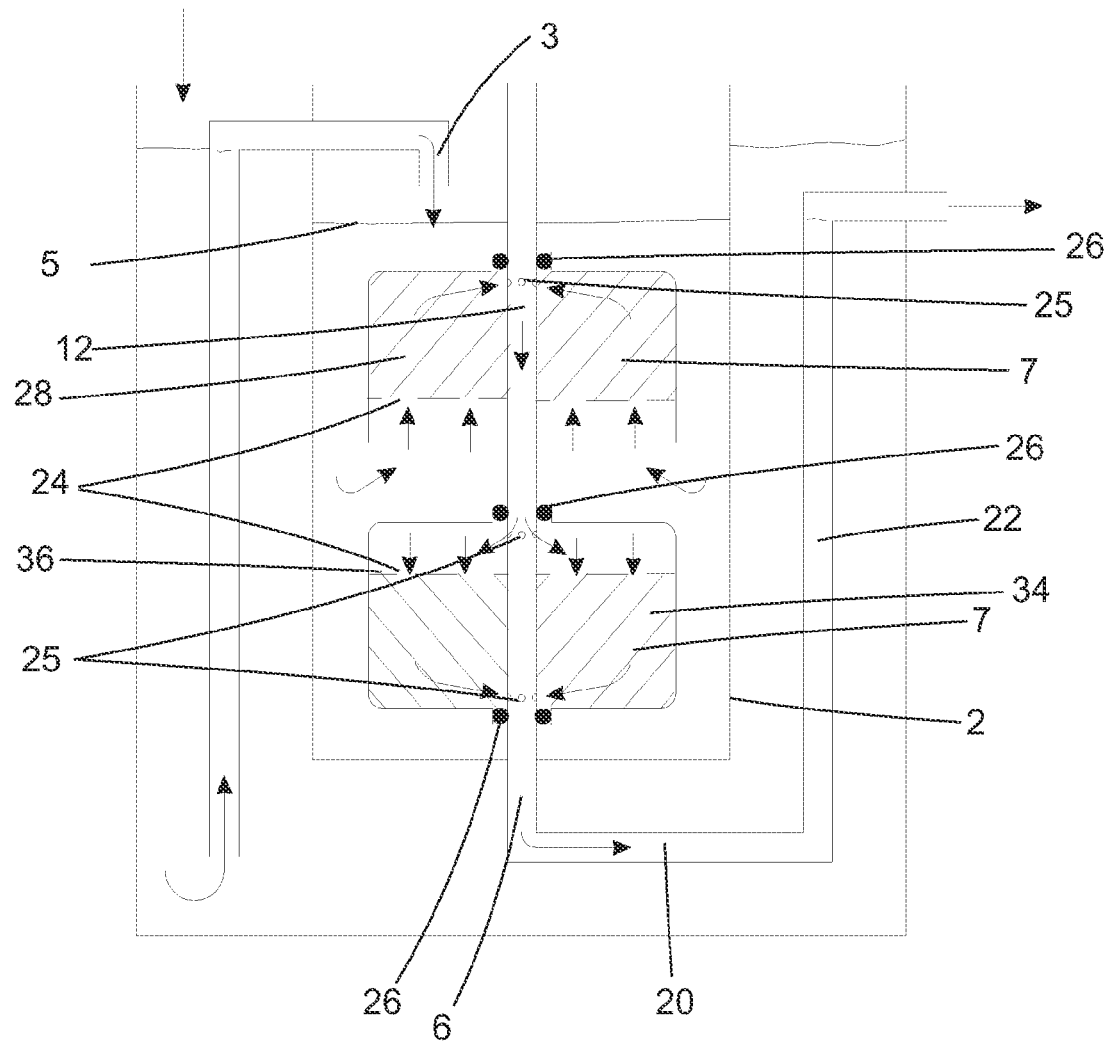
FIG. 11 shows a further variant of embodiment of the arrangement of cartridges in the container.

FIG. 11 shows a similar variant of embodiment, in which the cartridges 4 are likewise arranged slid onto the riser 12. In the said variant of embodiment the fluid mixture flows from underneath through inlet openings 24 into a cartridge intake segment 28. In the example of embodiment shown the inlet openings 24 are arranged on a lower face of the cartridge intake segment 28, that is to say, on the side facing towards the outlet 6. The cartridge intake segment 28 is located completely within the fluid mixture. Via the riser 12 the filtered fluid gains access to a cartridge segment 34 that is located below, and is led via riser openings 25 into the filter material 7 of the cartridge segment 34, which is otherwise totally sealed off from fluids, so that the fluid can only flow into the latter via the riser 12. Within the cartridge segment 34 is provided an intermediate surface 36, which again has inlet openings 24. The inflowing fluid is uniformly introduced into the filter material 7 via the inlet openings 24. The newly filtered fluid gains access back into the riser 12 via further riser openings 25, and flows out of the separation device 1. In this variant of embodiment the riser 12 is not closed at its end, instead it is led out of the container 2 so that, if so required, further fluids can be supplied to the riser line 22 when the container is being primed. Cartridge sealing rings 26 seal the segments 28, 34 with respect to the riser and the surrounding fluid mixture.

Figure 12:
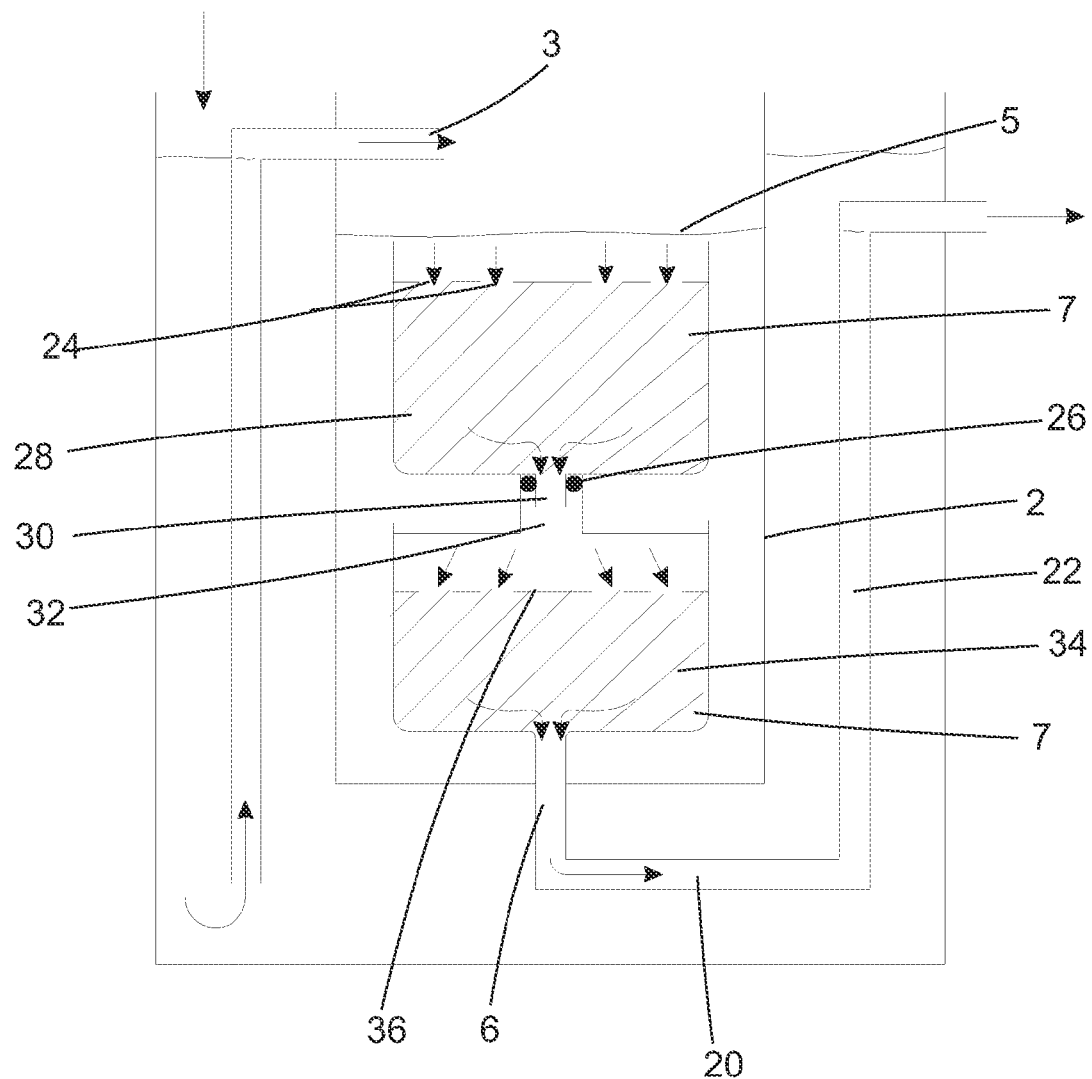
FIG. 12 shows a further variant of embodiment of the arrangement of cartridges in the container.

FIG. 12 shows a further variant of embodiment of the arrangement of the cartridges 4 in the container 2. A cartridge intake segment 28 is once again shown, into which the fluid mixture flows through inlet openings 24. In the example of embodiment shown the inlet openings 24 are arranged on the upper face of the cartridge intake segment 28, that is to say, on the side facing away from the outlet 6. A riser 12 is not provided; the cartridge intake segment is located completely within the fluid mixture. The cartridge intake segment 28 has an outlet 30, which leads into an intake 32 of a cartridge segment 34 arranged underneath the cartridge intake segment 28. The cartridge segment 34 is otherwise totally sealed off from fluids, so that fluid can only flow into the latter through the intake 32. Within the cartridge segment 34 an intermediate surface 36 is once again provided; in turn this has inlet openings 24. The inflowing fluid is uniformly introduced into the filter material 7 via the inlet openings 24. The cartridge intake segment 34 also has an outlet 30, which, in the example of embodiment shown, leads out into the outlet 6 of the container 2.

The individual segments 4, 28, 34 can be interconnected in a quick and simple manner, whereby sealing takes place via cartridge sealing rings 26, which are arranged in the vicinity of the cartridge outlet 30 or the cartridge intake 32.

For each of the variants of embodiment in accordance with FIGS. 10 to 12 it is true to say that one or more further cartridges 4, cartridge intake segments 28, or cartridge segments 34, can be provided. In particular it is also possible to use a plurality of risers 12, preferably arranged next to one another, with corresponding segments 4, 28, 34.

The disclosure is not limited to the examples of embodiment described; these just serve to provide exemplary elucidations of the disclosure.

The invention claimed is:

1. A separation device for purposes of separating one constituent from a fluid mixture, with
    a container;
    an inlet and at least one outlet, wherein the inlet is arranged above the outlet;
    a filter material, which has the ability to bind the constituent and is arranged within the container between the inlet and the outlet such that the flow is through the filter material,
    the filter material is arranged in a cartridge inserted into the container, wherein a hinge-type lever mechanism for forming a detachable connection between the cartridge and the container is provided, the hinge type lever mechanism including a lever engaged with an opening on the upper face of the cartridge and attached to the container by means of a latching mechanism to form the detachable connection; and
    an outlet line is connected to the outlet, the outlet line translates into a riser line for draining a filtered fluid.

2. The separation device in accordance with claim 1, wherein a plurality of cartridges are provided.

3. The separation device in accordance with claim 2, wherein the plurality of cartridges are arranged such that they are immersed in the fluid level of the first and second fluids in the container.

4. The separation device in accordance with claim 1, wherein the cartridge is manufactured from a thermoplastic.

5. The separation device in accordance with claim 1, wherein a single inlet into the container is provided.

6. The separation device in accordance with claim 1, wherein the cartridge has an essentially triangular cross-section.

7. The separation device in accordance with claim 2, wherein the plurality of cartridges are arranged one above another in the container.

* * * * *